May 12, 1959     P. M. MINDER     2,886,768
STATIC VOLTAGE AND CURRENT SENSITIVE DEVICE
Filed July 12, 1954

INVENTOR.
Peter M. Minder
BY *[signature]*

Attorney

United States Patent Office 2,886,768
Patented May 12, 1959

2,886,768

STATIC VOLTAGE AND CURRENT SENSITIVE DEVICE

Peter M. Minder, Milwaukee, Wis., assignor to McGraw-Edison Company, a corporation of Delaware Application July 12, 1954, Serial No. 442,469

10 Claims. (Cl. 323—66)

This invention relates to apparatus for detecting electrical conditions in an alternating current circuit and is more particularly described with reference to static equipment for controlling voltage regulating equipment connected to such circuit.

It is common practice to regulate the voltage in electrical transmission and distribution systems through the medium of tap changing transformers or shunt capacitors adapted to raise or lower the voltage by selectively changing taps or by varying the number of capacitors. In any case, there must be connected to the circuit, whose voltage it is desired to regulate, voltage sensitive apparatus which causes operation of the tap changer or switches which connect the proper number of capacitors to effect the desired voltage correction.

To provide background for illustrating an application of the invention, reference is made to one well known voltage sensitive device in the form of the contact-making-voltmeter, which is essentially an induction disk type of instrument made voltage sensitive.

In this form, the torque developed by the voltmeter is a function of the source voltage and the meter is adapted to attain equilibrium when the magnetic torque equals the counter torque of a suitable spring. A revoluble shaft carries a conducting arm which is arranged to assume a mid-position between two fixed contacts when the system voltage has a predetermined normal magnitude. When the system voltage varies above or below normal, the conducting arm swings in one direction or the other into contact with either of two adjustable stationary contacts located in the path of the swinging arm. Through the aforementioned contacts the voltmeter may alternately energize and deenergize a servo-mechanism adapted to lower or raise the system voltage by connecting or disconnecting shunt capacitors to or from the system or adapted to change taps in a regulator.

It is to be appreciated that in order to attain consistent operation and required sensitivity to line voltage fluctuations, the contact making voltmeter must be constructed with great electrical and mechanical precision. This, of course, necessitates use of delicate, accurately machined parts which causes the instrument to be inherently expensive and susceptible to damage by vibration or physical shock.

It is an object of this invention to overcome the above noted defects by providing a simplified form of voltage sensitive apparatus which avoids movable elements.

Another object of this invention is to provide a voltage sensitive device which may be easily constructed and calibrated.

Still another object is to provide electrical apparatus having wide applicability and which may be associated with any alternating current circuit wherein it is desired to measure or obtain a response to electrical conditions, such as current and voltage, within the circuit.

A further object of this invention is to provide a rugged low cost electrically sensitive device which performs its functions particularly efficiently.

Broadly stated, the forthcoming example of the invention contemplates serially connecting impedances one of which has a linear relation between its current and voltage and the other a non-linear relationship, so that, if plotted on the same axes, the curves representing the voltage characteristics of each impedance will intersect at a point where their absolute values are equal. The intelligence voltage value, occurring with equality of voltages across each impedance as represented by the point of intersection of the curves, is denominated by the terms reference or balance voltage. In the event that the applied voltage departs from the reference value, unequal voltages appear across the impedances. Advantage is taken of this voltage inequality by rectifying the two components and using the differential direct current output produced thereby in a variety of ways, one of which is to actuate a servo-mechanism which indirectly restores the line voltage to the initial reference value as in the illustrative embodiment disclosed herein.

Attainment of the aforegoing and other objects will become apparent upon reading the following specification in conjunction with the drawing in which:

Fig. 1 schematically illustrates a preferred embodiment of the invention;

Fig. 2 graphically represents the relationship between the voltages across the two components constituting the voltage sensitive part of the novel electric circuit;

Like reference numerals designate like parts throughout the various views.

Figure 1:
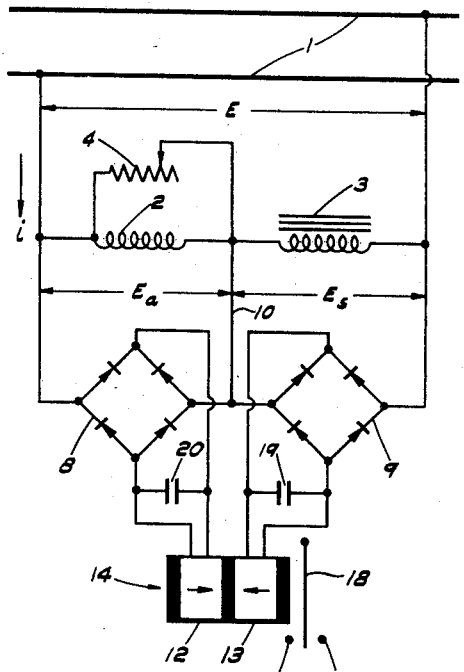

Referring particularly to Fig. 1 of the drawing, reference character 1 indicates an alternating current system whose voltage E it is desired to maintain at a constant value or whose voltage and current fluctuations it is merely desired to detect. In practice, where system voltages may be high, it is preferable to supply lines 1 through a step-down potential transformer (not shown) so that lines 1 merely reflect a proportionate part of the main system voltage.

Reactors 2 and 3 are serially connected across lines 1 and subjected to the same voltage E as exists across the lines. Reactor 2 is preferably a non-saturable air or steel core reactor. A variable resistor 4 is shunted across the terminals of reactor 2 for the purpose of conveniently establishing a predetermined voltage drop $E_a$ across the reactor 2 terminals. The current-voltage characteristic across the parallel circuit comprising unsaturated reactor 2 and linear resistance 4 is represented by the straight line designated $E'_a$ in Fig. 2 which figure shows the current $i$, flowing through each of the reactors 2 and 3, plotted against their respective voltages.

Figure 4:
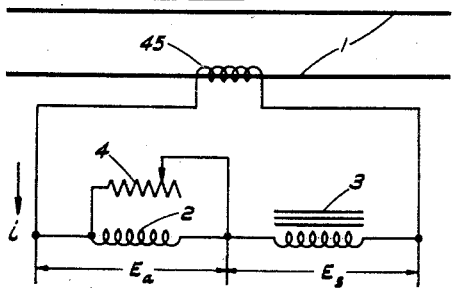
Fig. 4 represents another modification of the invention.

Linear reactor 2 is illustrated in Figs. 1 and 4 consisting of an ordinary air core with fixed reactance, but it is possible to substitute therefor any reactor which will permit attaining the desired voltage drop thereacross. Moreover, reactor 2 may have a magnetic core provided it is designed not to saturate within the full operating range and to have a proper characteristic. Also, an air or steel core reactor of the variable type may be substituted for the combination of 2 and 4.

Reactor 3, connected in series with reactor 2, is of the type having a magnetic core which is saturated at all values of current within the operating range of the voltage sensitive part of the circuit. The voltage drop $E_s$ produced across saturated reactor 3, due to the same current that flows through reactor 2, is represented by curve $E'_s$ in Fig. 2. According to Fig. 2, the voltage $E_s$ across reactor 3 rises very sharply until saturation occurs and then rises very little as a result of the small resistance inherent in the reactor winding and the power losses in the core. It is preferable to select a saturated reactor 3 having a low ratio of resistance with respect to reactance and low core losses, in order to obtain the flattest possible voltage-current charactecistic curve $E'_s$.

Figure 2:
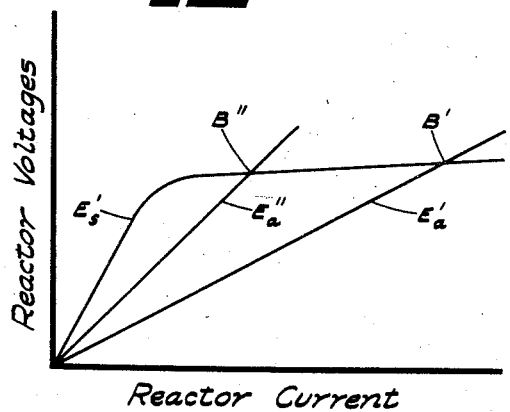

Note in Fig. 2 that the characteristic curves $E'_a$ and $E'_s$ intersect at a point B', as a result of their dissimilar slopes, when the voltage $E_a$ across unsaturated linear reactor 2 equals the magnitude of the voltage $E_s$ across saturated reactor 3. Hence, B' and B" represent a balance point between the reactor voltages; a condition which prevails when the intelligence voltage E has the exact magnitude which it is normally desired to maintain and the voltages $E_a$ and $E_s$ are equal. This voltage equality between reactors 2 and 3 is easily obtained by means of adjusting resistor 4 or reactor 2. Moreover, it is preferable to select reactors having equal power factors at the balance voltage.

A symmetrical full wave rectifier 8 has its alternating current input terminals connected across linear reactor 2 in such a manner that the voltage drop $E_a$ is always impressed on rectifier 8. A similar rectifier 9 is connected so that the voltage $E_s$ developed across saturated reactor 3 is impressed across the input terminals of the rectifier 9. The mid points between adjacent reactors and adjacent rectifiers are joined by a common conductor 10.

Figure 3:
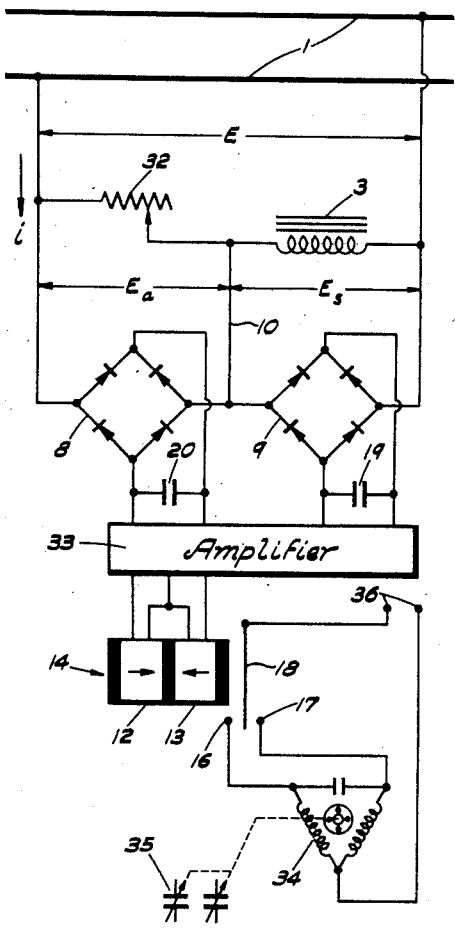
Fig. 3 represents an alternative form of the invention.

The direct current output of rectifiers 8 and 9 are shown for the purpose of illustration in Fig. 1 to be conducted respectively to coils 12 and 13 of a polarized differential relay indicated generally by reference character 14. A magnetic arm 18 is pivotally mounted for attraction by either coil 12 or 13, depending upon which coil has the higher voltage impressed on it. At the balance point, arm 18 is disposed midway between contacts 16 and 17. Upon attraction by either coil, arm 18 makes electrical contact with one or the other of terminals 16 and 17. By this means pivot arm 18 may selectively close a circuit, such as illustrated in Fig. 3 which supplies a motor 34 for actuating a tap changer (not shown) or capacitor switching arrangement 35 or some other device. To avoid vibration of the pivot arm 18 due to the pulsations of the rectified direct current, filtering capacitors 19 and 20 are connected across each rectifier.

An alternative arrangement of the inventior is illustrated in Fig. 3 which differs from Fig. 1 primarily by reason of an adjustable resistor 32 being substituted in place of the linear reactor 2-resistor 4 combination of Fig. 1. In Fig. 3 the arrangement of the components remains the same although the direct current output from rectifiers 8 and 9 is shown being fed into any form of servo-mechanism or amplifier 33 which is capable of receiving and utilizing the power output of the voltage sensitive device.

Although it has been hereinbefore indicated, and illustrated in Fig. 3, that a linear resistor 32 may be substituted for the linear reactor 2, it is nevertheless advantageous to use a linear reactor because the latter tends to minimize the effects of possible harmonics in voltage E. In contradistinction, when a linear resistor is employed in conjunction with a saturable reactor, the voltage appearing across the resistor will have the same wave form as that of the current, whereas the voltage appearing across the saturable reactor may be of a different wave form. As a consequence, the balance point B' of the reactor voltages may tend to shift slightly due to the difference in root-mean-square voltage. However, when an air core reactor and a saturated reactor are used jointly, a harmonic current will affect the voltage across each reactor practically similarly.

Adjustable resistor 4, shunted across linear impedance 2, when set a higher value, has the effect of lowering the current through reactors 2 and 3 and causing a shift in the voltage distribution across the reactors. Upon this event, the slope of the voltage-current characteristic curve shown in Fig. 2 shifts from $E'_a$ to a position such as $E''_a$, and it is apparent that the balance point also shifts from B' to B". By means of adjusting resistor 4, then, it is possible to obtain equal voltages or balance between the reactors for any value of line voltage E through a wide range.

As stated heretofore, when the reference voltage E has been selected and the reactors are balanced so that $E_a$ and $E_s$ are equal at that reference voltage, direct currents of equal magnitude will flow through each of the rectifiers 8 and 9, assuming that the load on each rectifier is equal. However, when the input voltage E exceeds the line 1 reference voltage, an increased voltage $E_a$ will appear across linear reactor 2, although little, if any, increase in $E_s$ will appear across reactor 3 because of its flat characteristic curve $E'_s$. The difference between the two voltages $E_a$ and $E_s$ is manifested by an increased direct current flow from rectifier 8 in comparison to rectifier 9. Conversely, by the same principle, if E falls below the reference voltage by a very small amount, rectifier 8 will conduct less current than rectifier 9. In either case, sufficient voltage difference will appear between reactors to operate polarized differential relay 14 or amplifier 33 in the example shown in Fig. 3, thereby closing a control circuit through reversible motor 34, which is adapted to vary the number of capacitors 35 connected to line 1, until voltage E has been restored to its reference value.

Although the mode of operation set forth in the preceding paragraph utilizes an operating condition where $E_a$ and $E_s$, the voltages across respective reactors 2 and 3, are equal at the balance point as are the direct currents flowing through the respective rectifiers 8 and 9, the invention is not so limited. For it is within the scope of the invention to employ the voltage sensitive part of the circuit in such manner as to make an auxiliary device such as the differential relay 14 or amplifier 33 responsive to any predetermined difference between voltages $E_a$ and $E_s$, or the same devices may be calibrated to attain equilibrium at any predetermined voltage difference between $E_a$ and $E_s$. Expressed in terms of the curves shown in Fig. 2, advantage may be taken of voltage conditions represented by the ordinate differences between curves $E'_a$ and $E'_s$ as well as when these voltages are equal as represented by points B' and B".

In actual experience, it has been found that the voltage sensitive circuit disclosed herein responds to very small variations in line 1 voltage with appreciable change in direct current output by the rectifiers. Those skilled in the art will appreciate that the sensitivity of the device may be enhanced by inserting an amplifier 33 in the circuit to receive the minute direct current output from rectifiers 8 and 9. With this arrangement very small voltage differences between $E_a$ and $E_s$ may be impressed on a transistor or vacuum tube to attain the desired power for any control action.

The specification thus far has related primarily to an application of the voltage sensing circuit comprising the two serially connected reactors arranged for response to voltage conditions in a source such as power line 1. There are, however, circumstances where the voltage on line 1 may be held practically constant by regulating means and where only the current varies, thereby precluding the use of only the voltage sensing features of the invention.

For the purpose of illustrating means of adapting the invention for response to current conditions, attention is directed to Fig. 4. This figure shows only the basic voltage or current sensitive part of the invention, comprising reactors 2 and 3, connected to the power line 1 through an intermediate current transformer 45 which reflects current conditions in the line. Hence, if line current varies, the current in the reactors 2 and 3 will vary, and there will be corresponding variations in the voltages $E_a$ and $E_s$ as described hereinbefore with respect to Figs. 1, 2 and 3. Consequently, if some minimum of refererence value of current has been chosen for power line 1, it is possible to maintain that value by again actuating some control means which is responsive to the difference between voltages $E_a$ and $E_s$.

It is to be appreciated that adaptation of the invention to current sensitivity, as illustrated in Fig. 4, may be further simplified by merely substituting serially connected reactors 2 and 3 in place of the current transformer 45 in line 1 so that voltages $E_a$ and $E_s$ are developed directly in response to current flowing in the line.

In the foregoing specification an electrical apparatus has been described which has the inherent advantages of structural simplicity, economical manufacture and great sensitivity to changes in an electrical circuit. Moreover, the inventive apparatus is especially rugged because it embodies no delicate moving parts and is economical to use because of its low power consumption.

Although the invention is particularly described and illustrated in the specification and drawing in relation to means for detecting voltage or current in a power system, it is obvious that such application of the invention can be extended to other fields like electronics, etc. It is to be appreciated that the novel electric circuit may be used in conjunction with any circuit where it is desired to detect and utilize conditions of voltage and current equality or inequality. Those skilled in the art will readily perceive modifications and uses of the invention, other than those disclosed. Therefore, an aim of the appended claims is to cover all such modifications as fall within the true spirit and broad scope of the invention.

It is claimed:

1. In combination with a variable voltage alternating current source, a voltage sensitive apparatus comprising a linear impedance element and a non-linear impedance element in series relation with each other and connected to said source, said non-linear impedance having a magnetic core which is saturated at all values of current above a predetermined minimum to thereby exhibit a substantially constant and linear voltage drop thereacross for currents above the said minimum, the voltage drop across impedance element bearing one relationship to each other at a predetermined value of source voltage and another relationship at other values of source voltage, amplifier means connected in parallel with each impedance element responsive to the independent voltage drops thereacross, reversible motor means responsive to the output of said amplifier, and voltage correcting means driven by said motor means, whereby said source voltage may be restored to said predetermined value in response to unequal voltage drops across said impedance elements.

2. In combination, means for detecting voltage fluctuations in an alternating current line, said means including a linear reactor and a non-linear reactor serially connected to each other across said line, said non-linear reactor having a magnetic core which is saturated at all values of current above a predetermined minimum to thereby exhibit a substantially constant and linear voltage drop thereacross for currents above the said minimum, said reactors being characterized by producing voltages across them bearing one relationship to each other when conducting current supplied by said power line at a predetermined reference voltage and by producing voltages bearing another relationship to each other when the current through said series reactors varies due to line voltage deviations from the reference voltage, a rectifier connected in shunt across each reactor, respectively, said rectifiers being energized by the voltages appearing across each of said reactors, respectively, and means selectively responsive to the resultant output of said rectifiers.

3. In combination, means for detecting voltage fluctuations in an alternating current power line, said means including a linear reactor element and a saturable reactor element serially connected with each other across the power line, said saturable reactor having a magentic core which is saturated at all values of current above a predetermined minimum to thereby exhibit a substantially constant and linear voltage drop thereacross for currents above the said minimum, a plurality of rectifiers serially connected with each other in parallel relationship with said reactors and electrically joined at their intermediate connection with the intermediate connection of said reactors, a differential relay having a pair of coils separately connected to each rectifier, respectively, whereby voltage fluctuations in said power line will effect unequal voltages across each reactor and their associated rectifiers, respectively, for effectively operating said differential relay.

4. In combination, means for detecting voltage fluctuations in an alternating current power line, said means including a linear reactor and a resistor each connected to said power line and to each other to form a parallel group, a non-linear reactor serially connected to said group and said power line, said non-linear reactor having a magnetic core which is saturated at all values of current above a predetermined minimum to thereby exhibit a substantially constant and linear voltage drop thereacross for currents above the said minimum, the voltage drop across the parallel group bearing a predetermined relationship to the voltage drop across the non-linear reactor at a given line voltage and the voltage drop across said group bearing a different relationship to the voltage drop across the non-linear reactor at other values of line voltage, means shunted across said group and said non-linear reactor responsive to the voltages occurring across said reactor and said group.

5. In combination, means for detecting voltage fluctuations in an alternating current power line, said means including a linear reactor and a saturable reactor serially connected with each other across the power line, said saturable reactor having a magnetic core which is saturated at all values of current above a predetermined minimum to thereby exhibit a substantially constant and linear voltage drop thereacross for currents above the said minimum, a pair of rectifiers serially connected with each other in parallel relation with said reactors and electrically joined at their intermediate connection with the intermediate connection between said reactors, an amplifier connected to said rectifiers and selectively responsive to the voltage therefrom, a differential relay connected to said amplifier for receiving the output thereof, motor means electrically connected through said relay, and voltage correcting means actuated by said motor means whereby voltage fluctuations in said power lines may be compensated.

6. Means for detecting voltage fluctuations in an alternating current source, said means comprising a resistor component and a saturable reactor component serially connected across said source for receiving current therefrom, each component producing equal voltage drops thereacross at a predetermined reference value of source voltage, and unequal voltage drops when said source voltage deviates from said reference value, said saturable reactor component having a magnetic core which is saturated at all values of current above a predetermined minimum to thereby exhibit a substantially constant and linear voltage drop thereacross for currents above the said minimum, and means connected across each of said components which are responsive to the difference between voltages across the resistor and reactor, respectively.

7. In combination, means for detecting voltage fluctuations in an alternating current power line, said means including a resistor element and a saturable reactor element serially connected across the power line, said saturable reactor element having a magentic core which is saturated at all values of current above a predetermined minimum to thereby exhibit a substantially constant and linear voltage drop thereacross for currents above the said minimum, said resistor and reactor elements being characterized by producing equal voltages across each of them when conducting current supplied by said power line at a predetermined reference voltage and by producing unequal voltages when the current through them varies and the line voltage deviates from the reference voltage, a rectifier connected in shunt across each resistor and reactor, respectively, said rectifiers being energized individually by the voltages appearing across each of said elements, respectively, and means responsive to the change produced in the output voltage from said rectifiers due to variations in the power line voltage.

8. In combination with an alternating current source, a voltage sensitive apparatus comprising a linear impedance element and a non-linear impedance element in series relation with each other and connected to said source, said non-linear impedance element having a magnetic core which is saturated at all values of current above a predetermined minimum to thereby exhibit a substantially constant and linear voltage drop thereacross for currents above the said minimum, said impedances being characterized by the voltage drop across one of them bearing a predetermined relationship to the voltage drop across the other at a given value of source voltage and the voltage drop across said one of them bearing a different relationship to the voltage drop across the other for other values of source voltage, and means connected in parallel with each impedance which are responsive to the difference between voltages across the serially connected linear and non-linear impedance elements, respectively.

9. In combination with an alternating current system, a current transformer having a primary winding connected in a line of said system and a secondary winding responsive to current conditions in said primary winding, voltage sensitive apparatus for deriving voltage signals in response to said current conditions, said voltage sensitive apparatus comprising a linear impedance and a non-linear impedance serially connected with each other across said secondary winding for receiving current therefrom, said non-linear impedance element having a magnetic core which is saturated at all values of current above a predetermined minimum to thereby exhibit a substantially constant and linear voltage drop thereacross for currents above the said minimum, said impedances being characterized by the voltage drop across one of them bearing a predetermined relationship to the voltage across the other at a given value of total voltage across said serially connected impedances which is a function of a given value of the current in said lines and the voltage across said one of them bearing a different relationship to the voltage drop across the other for other values of total voltage which are functions of other values of the current in said line, and means connected in parallel with each impedance which are responsive to the difference between voltages across the serially connected linear and the non-linear impedance elements respectively.

10. In combination with an alternating current system, voltage sensitive means for deriving voltage signals in response to current conditions in said system, said voltage sensitive means including a linear impedance element and a non-linear impedance element in series relation with each other and connected to said source, said non-linear impedance element having a magnetic core which is saturated at all values of current above a predetermined minimum to thereby exhibit a substantially constant and linear voltage drop thereacross for currents above said minimum, said impedances being characterized by the voltage drop across one of them bearing a predetermined relationship to the voltage drop across the other at a given value of total voltage across said serially connected impedances which is a function of a given value of the current in said system and the voltage drop across said one of them bearing a different relationship to the voltage drop across the other for other values of total voltage which are functions of other values of the system current and means connected in parallel with each impedance which are responsive to the difference between voltages across the serially connected linear and non-linear impedance elements respectively.

References Cited in the file of this patent
UNITED STATES PATENTS

| | | |
|---|---|---|
| 1,883,613 | Devol | Oct. 18, 1932 |
| 1,914,220 | Sorensen et al. | June 13, 1933 |
| 1,953,487 | Knoop | Apr. 3, 1934 |
| 2,239,768 | Artzt | Apr. 29, 1941 |
| 2,464,567 | Fisher | Mar. 15, 1949 |
| 2,509,865 | Hedstrom et al. | May 30, 1950 |